United States Patent [19]

Reeder

[11] Patent Number: 5,418,845
[45] Date of Patent: May 23, 1995

[54] ARRANGEMENT FOR OBTAINING INFORMATION FROM A SWITCHING SYSTEM DATABASE BY AN ADJUNCT PROCESSOR

[75] Inventor: Robert D. Reeder, Westminster, Colo.

[73] Assignee: AT&T Corp., Murray Hill, N.J.

[21] Appl. No.: 890,501

[22] Filed: May 28, 1992

[51] Int. Cl.⁶ .................... H04M 3/22; H04M 3/50
[52] U.S. Cl. ........................ 379/213; 379/34; 379/89; 379/201
[58] Field of Search .............. 379/89, 213, 214, 10, 379/201, 207, 34, 14, 67, 88

[56] References Cited

U.S. PATENT DOCUMENTS

| | | | |
|---|---|---|---|
| 4,389,546 | 6/1983 | Glisson et al. | 379/88 |
| 4,633,041 | 12/1986 | Boivie et al. | 379/354 |
| 4,646,346 | 2/1987 | Emerson et al. | 379/214 |
| 4,734,931 | 3/1988 | Bourg et al. | 379/93 |
| 4,748,656 | 5/1988 | Gibbs et al. | 379/93 |
| 4,879,743 | 11/1989 | Burke et al. | 379/142 |
| 4,897,866 | 1/1990 | Majumdar et al. | 379/94 |
| 4,926,462 | 5/1990 | Ladd et al. | 379/67 |
| 4,935,956 | 6/1990 | Hellworth et al. | 379/112 |
| 5,012,511 | 4/1991 | Hank et al. | 379/211 |
| 5,029,200 | 7/1991 | Haas et al. | 379/89 |
| 5,060,255 | 10/1991 | Brown | 379/67 |
| 5,117,451 | 5/1992 | Ladd et al. | 379/67 |
| 5,181,239 | 1/1993 | Jolissaint | 379/96 |
| 5,185,781 | 2/1993 | Dowden et al. | 379/67 |
| 5,259,026 | 11/1993 | Johnson | 379/207 |

FOREIGN PATENT DOCUMENTS 0238257  9/1987  European Pat. Off. ...... H04M 3/50

OTHER PUBLICATIONS

P. F. J. Smeenk, *Sopho–Supervisor 50: An Intelligent Operator Workstation for SOPHO-PABXs*, Philips Telecommunication Review, vol. 46, No. 4, Dec. 1988, Hilversum NL, pp. 47–61.

*Primary Examiner*—Thomas W. Brown
*Attorney, Agent, or Firm*—David Volejnicek

[57] ABSTRACT

To obtain its own copy of directory information from a database (111) of a switching system (10), an adjunct processor such as a voice-mail system (11) either uses the "directory" feature of the switching system by emulating use of the feature by a digital display telephone (140), or uses a remote administration and maintenance port (119) by emulating use of the port by a remote administration terminal (145).

16 Claims, 4 Drawing Sheets

ARRANGEMENT FOR OBTAINING INFORMATION FROM A SWITCHING SYSTEM DATABASE BY AN ADJUNCT PROCESSOR

CROSS-REFERENCE TO RELATED APPLICATION

Incorporated by reference herein is application of G. R. Brunson and R. D. Reeder entitled "Adjunct Processor Embedded in a Switching System", Ser. No. 07/826,345, filed on Jan. 27, 1992, and assigned to the same assignee as this application, now issued as U.S. Pat. No. 5,311,576.

TECHNICAL FIELD

This invention relates to the field of integration of adjunct processors with telecommunications switching systems.

BACKGROUND OF THE INVENTION

The use of adjunct processors in conjunction with telecommunications switching systems is well-known in the art. The adjunct processors are used to supplement the capabilities of the switching systems, such as to provide features and services that the switching systems are either incapable or ill-capable of providing. An illustrative example of a commonly-used type of adjunct processor is voice-mail systems.

In order to perform their functions, adjunct processors often have need of information that is contained in the database of the corresponding switching system. In the case of voice-mail systems, this information is the directory information which defines the correspondence between subscribers' names and extension numbers.

Numerous arrangements exist for providing the adjunct processor with this information. Many of today's switches come equipped with a control communications link to which the adjunct processor can attach and over which it can interrogate the database of the switching system. However, most manufacturers of switching systems use proprietary communications protocols on the control communications links, making it difficult, if not impossible, to use any other manufacturers' adjunct processors with their switching systems.

To avoid this difficulty, the adjunct processor may be equipped with its own, independent, database which the owner of the adjunct populates with a copy of the contents of the switching system's database prior to using the adjunct processor. This requires the system owner to administer and maintain two databases—a complex and a time-consuming task. It is also prone to error unless the owner rigorously ensures that all updates to the contents of one database are also timely and identically made to the other database.

To avoid this difficulty, some adjunct processors dispense with accessing switching system database information at their initiative, and instead rely upon the switching system to supply them with the requisite information when it is needed. For example, some switching systems send either the directory name or the directory number of the calling and called parties as display information to whatever terminal they are connecting the call to, and many voice-mail systems rely on this display information to convey to them the requisite directory information at the time that it is needed, i.e., at the beginning of each call. However, in order for the display information to convey the full directory information which the voice-mail system needs, i.e., both the names and the corresponding directory numbers, the contents of the switching system's database must be modified and re-administered so as to include the extension numbers in the name fields of the database records. Such re-administration of the switching system database is complex, costly, cumbersome, and error prone, and hence it is not favored by system owners.

To avoid the re-administration problem, one known messaging system places calls sequentially to every extension number of the switching system at some time of day when this is least likely to interfere with normal operation, e.g., between 2 and 3 o'clock in the morning. In response to every call, the messaging system receives the called party's name as display information from the switching system, and it stores the name and corresponding extension in its own database for future use. However, this is a time-consuming process which seriously interferes with normal operation of systems that are used on an around-the-clock basis. Furthermore, this system is error-prone in that is relies on the messaging system having been previously provided with, and being continually updated with, the complete and correct set of switching system extension numbers, by the system administrator.

Consequently, what the art requires is a simple and accurate way for adjunct processors to obtain up-to-date database information that mirrors switching system database information.

SUMMARY OF THE INVENTION

This invention is directed to satisfying the needs of the art while overcoming the problems of the prior art. According to the invention, an adjunct processor obtains database information from a switching system by interacting with the switching system as would a terminal—such as a remote administration terminal or a subscriber's station set—by means of which interactions the terminal would request and obtain access to contents of the switching system database. In response to simulating the interactions of the terminal with the switching system, the adjunct processor receives the desired contents of the switching system database—such as subscriber names and corresponding extension numbers—for its own use, i.e., for performing its adjunct processing functions, such as providing a voice-mail service. Preferably, the adjunct processor uses the received information to populate its own database therewith, for future use of the stored information by the adjunct processor. In one illustrative embodiment of the invention, the adjunct processor interacts with the switching system as would a subscriber terminal in using the switching system's "directory" feature. In another illustrative embodiment of the invention, the adjunct processor interacts with the switching system via a remote maintenance and administration port as would an administration terminal.

The invention allows for simple integration of an adjunct processor with a switching system without knowledge by the adjunct processor of any proprietary control communications protocols of the switching system. It allows the adjunct processor to automatically create its own database copy of requisite switching system information, and to automatically keep this copy up-to-date, synchronized with the contents of the switching system database. It requires no changes to be made to the switching system database format and to the manner in which the switching system is administered. In fact, it does not require any changes at all to the switching system. Rather, it ingeniously makes use of features that are already available on the switching system in order to provide the adjunct processor with the required information.

These and other advantages and features of the invention will become apparent from the following description of an illustrative embodiment of the invention taken together with the drawing.

DETAILED DESCRIPTION

Figure 1:
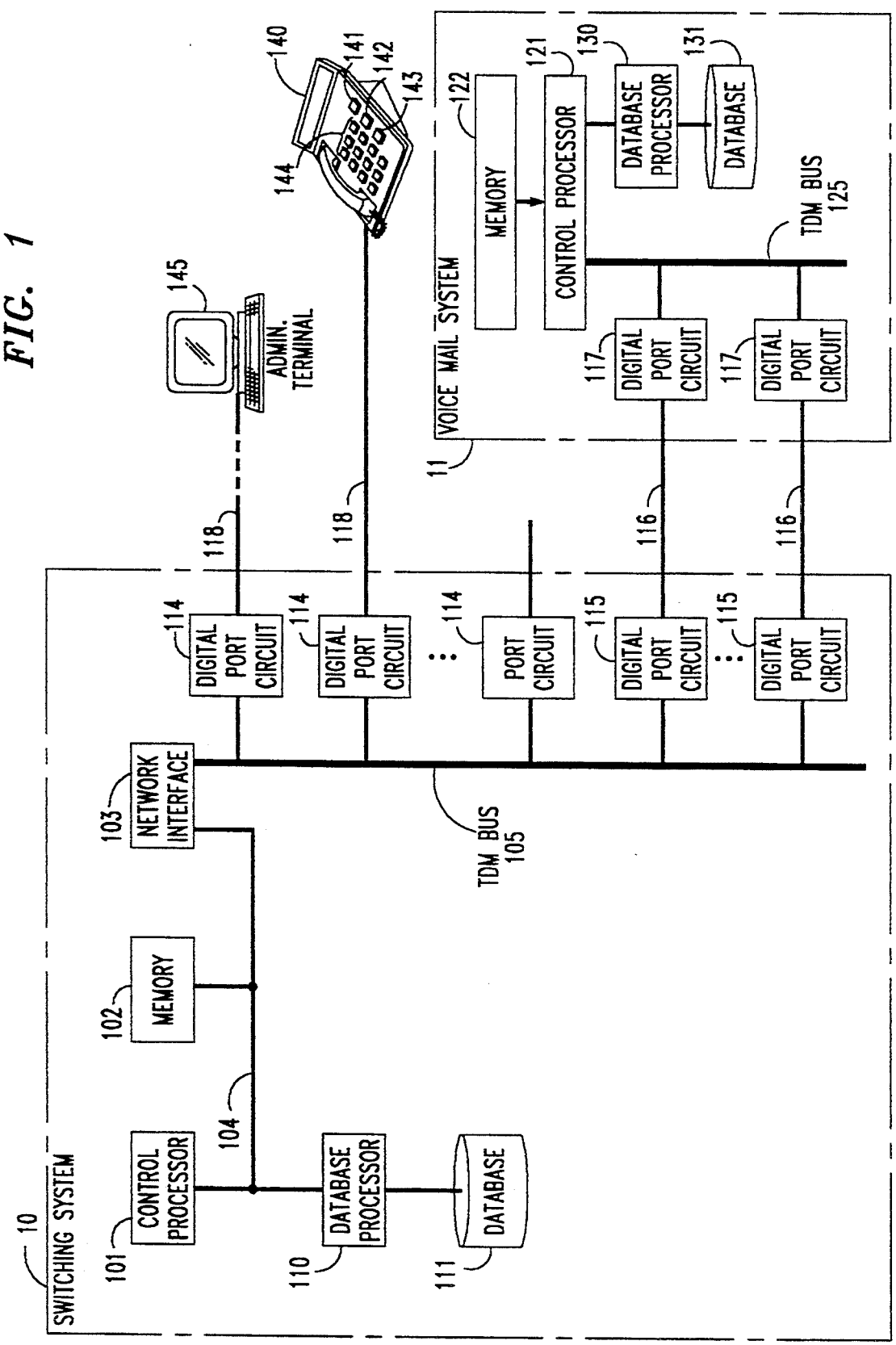
FIG. 1 is a block diagram of an illustrative telecommunications system equipped with an adjunct processor embodying an illustrative example of the invention.

FIG. 1 shows a combination of a switching system 10 and an adjunct processor which, in this illustrative example, is a voice-mail system 11. Switching system 10 is illustratively the AT&T System 75 or Definity ® G1 or G3 PBX, and voice-mail system 11 is illustratively the AT&T Audix ® voice-mail system. The particular devices are referred to only by way of illustration and not limitation; systems 10 and 11 may conceivably be any switching system and any adjunct processor.

Systems 10 and 11 are interconnected by a plurality of digital telephone lines 116. As is conventional, each line 116 defines one or more voice/data communication channels and a control communication channel. Illustratively, lines 116 are AT&T DCP lines or ISDN BRI or PRI lines.

In switching system 10, lines 116 are coupled by digital port circuits 115 to the switching system's switching fabric, which in this illustrative embodiment is a time-division multiplexed (TDM) bus 105. Other port circuits 114 couple other telephone lines and trunks 118 to TDM bus 105. Some of these lines and trunks 118 couple telecommunications terminals to switching system 10, either directly or via intervening telecommunications equipment such as other switching systems. Included among these terminals are subscriber station sets 140 and a remote administration terminal 145.

In an alternative configuration of the combined systems shown in FIG. 1, voice-mail system 11 may be embedded in switching system 10 and take the place of digital port circuits 115 on TDM bus 105. An illustrative embodiment of such a configuration is shown in a U.S. patent application of G. R. Brunson and R. D. Reeder entitled "Adjunct Processor Embedded in a Switching System", Ser. No. 07/826,345, filed on Jan. 27, 1992, and co-owned herewith, which has issued as U.S. Pat. No. 5,311,576. It is hereby incorporated herein by reference.

Switching system 10 further comprises a control processor 101, a memory 102, a network interface 103, and a database processor 110, interconnected by a memory bus 104. Network interface 103 provides processor 101 with access to TDM bus 105. Control processor 101 controls the operation of switching system 10 by executing programs from memory 102.

Database processor 110 manages a database 111, which includes the administrable information for switching system 10. This information includes subscriber records that include directory information that defines the correspondence between extension numbers and subscribers' names. To permit administration of switching system 10 from a remote site, database processor 110 conventionally has access to TDM bus 105 through network interface 103. By means of this connection, database processor 110 can be remotely dialed up, from a remote administration terminal 145, in the same manner as any other terminal equipment connected to a port circuit 114 or 115 can dial. Then, using a protocol that has been predefined for database processor 110, data can be remotely entered into or retrieved from database 111 by remote administration terminal 145.

Switching system 10 conventionally provides a user feature, called "directory", to any digital display telephone 140 that is connected to one of its port circuits 114 by a digital telephone line 118 and that is equipped with directory-feature function buttons 141-143. This feature gives a user at a telephone 140 access to the directory information stored in database 111.

A user invokes the directory feature by pressing "directory" button 141 on telephone 140. This pressing of the button is reported to switching system 10 via a message sent by telephone 140 in the control channel defined by line 118. Upon receipt of the message, control processor 101 responds by sending to telephone 140 a message carrying a display prompt for the user to enter the first character of the name of a desired subscriber. The user responds by pressing the key that corresponds to the desired character on keypad 144 of telephone 140. This pressing is again reported to switching system 10 via a control channel message, and processor 101 responds thereto by causing database processor 110 to retrieve from database 111 the record of a first subscriber whose name corresponds to the pressed key's corresponding characters. Control processor 101 then sends this record in a display message to telephone 140. The sent record contains both a subscriber name field and a subscriber extension number field.

The user at telephone 140 can specify the desired subscriber name with greater specificity by again pressing a key on keypad 144 which corresponds to the next character of the subscriber's name. Or, the user can sequentially cycle through all subscriber names that correspond to the pressed key's corresponding characters by repeatedly pressing a "next" button 142.

When the user at telephone 140 has obtained the extension number of the desired subscriber, the user cancels the directory feature by pressing a "normal" button 143.

Voice-mail system 11 is connected to digital telephone lines 116 by digital port circuits 117 which are the equivalents of digital port circuits 115. Port circuits 117 are connected to a control processor 121 via a TDM bus 125. Control processor 121 controls the operation of voice-mail system 11 and performs the voice-mail functions by executing programs out of a memory 122. Also connected to control processor 121 is a database processor 130 which manages a database 131. Database 131 is used to store voice-mail messages and information needed by system 11 to perform voice-mail functions.

According to the invention, the information stored by database 131 includes a copy of the directory information stored by database 111. Further according to the invention, voice mail system 11 obtains this copy from switching system 10 by making use of either the "directory" feature or the remote administration and maintenance port 119. System 11 typically obtains a copy on demand, and also periodically in order to keep its database 131 contents up-to-date with the contents of database 111. Furthermore, system 11 may be manually commanded to obtain a copy; this is desirable to do following the making of significant changes to the contents of database 111.

Figure 2:
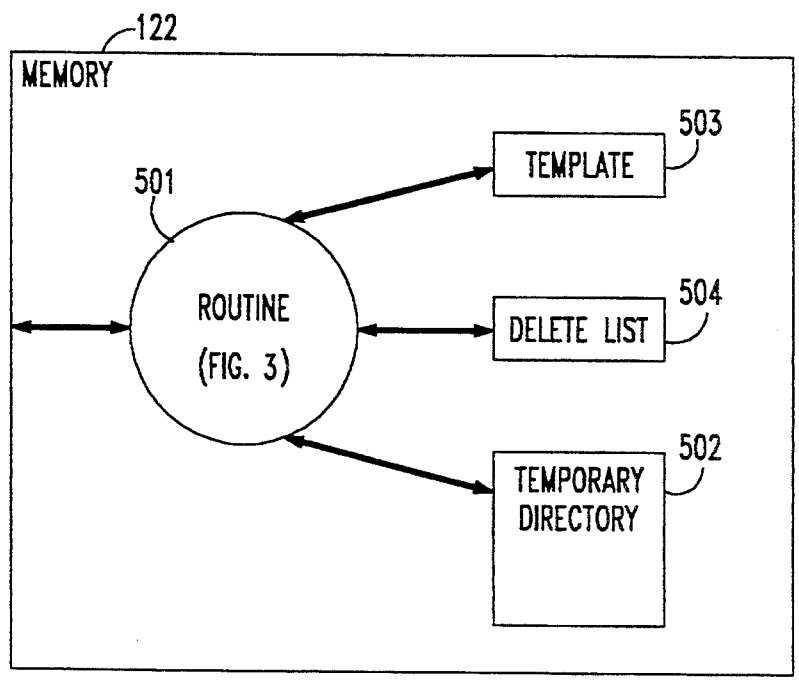
FIG. 2 is a block diagram of a first embodiment of the emulation function of the adjunct processor of FIG. 1.
Figure 3:
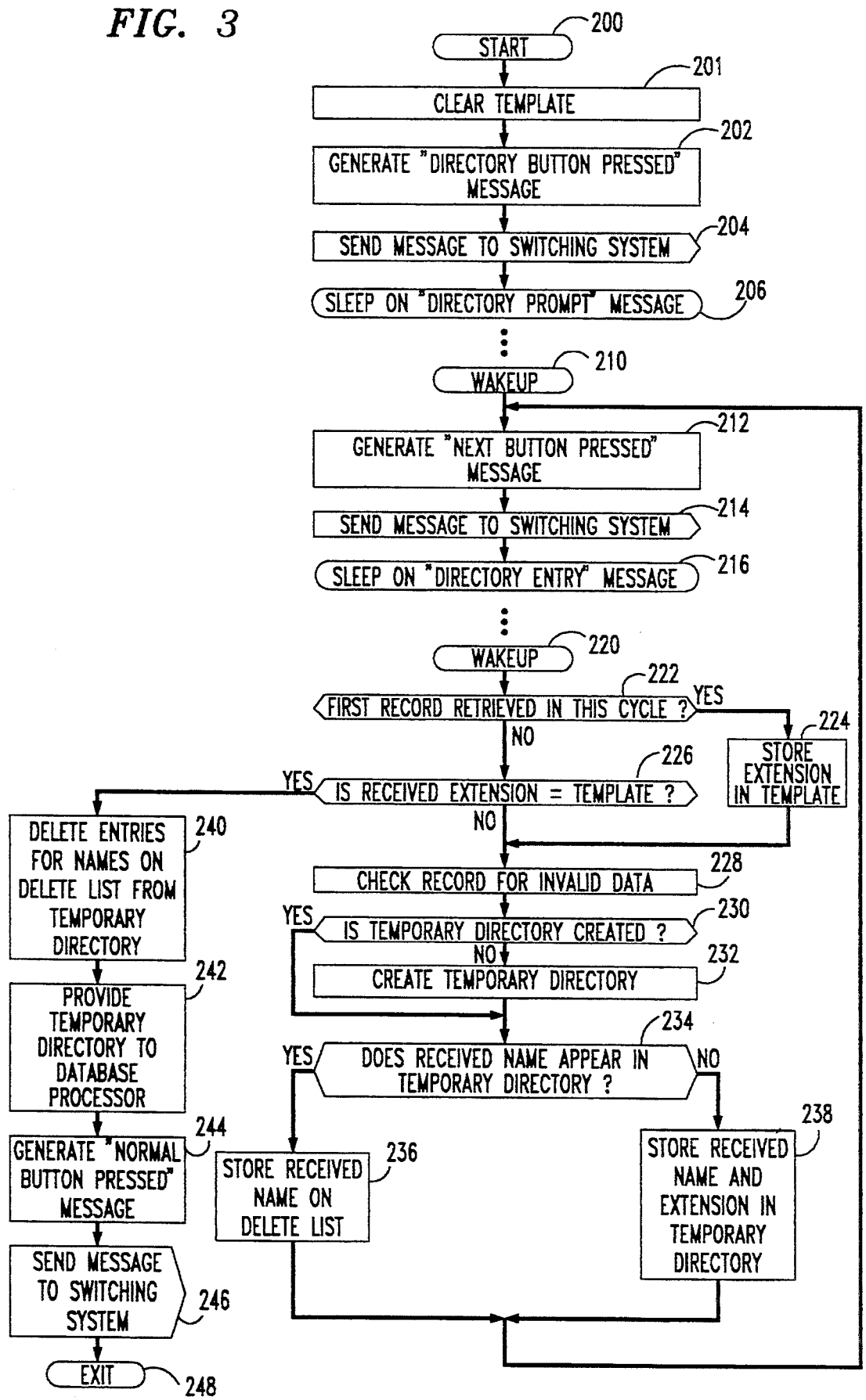
FIG. 3 is a flow diagram of the routine of the function of FIG. 2.

To obtain a copy of the directory information by using the "directory" feature of switching system 10, voice-mail system 11 makes use of the emulation function shown in FIG. 2. It comprises a plurality of data structures 502–504 and a routine 501 stored in memory 122. Temporary directory 502 has occasional transitory existence for updating directory information in database 131, as will be made clear below. Furthermore, there is a template 503 storage area and a delete list 504 storage area, whose use will be explained below. Data structures 502–504 are used by routine 501, which is flowcharted in FIG. 3.

Control processor 121 executes routine 501 from memory 122. Upon its invocation, at step 200, routine 501 clears template 503, at step 201 and then simulates the pressing of "directory" button 141 on telephone set 140 by generating a "directory button pressed" message, at step 202, and sending it to switching system 10 across a control channel of the connected digital phone line 118, at step 204. Routine 501 then goes to sleep to await receipt of a "directory prompt" message, at step 206.

Control processor 101 of switching system 10 responds to receipt of the "directory button pressed" message as described previously and returns the "directory prompt" message to voice-mail system 11.

Receipt of this awaited message results in routine 501 being awakened, at step 210. Routine 501 now simulates the pressing of "next" button 140 on a telephone set 140 by generating a "next button pressed" message, at step 212, and sending it to switching system 10 across the control channel of line 118, at step 214. Routine 501 then returns to sleep to await receipt of a "directory entry" message, at step 216.

Control processor 101 responds to receipt of the "next button pressed" message by causing database processor 110 to retrieve from database 111 a first directory record from the list of stored directory records. Control processor 101 then sends this record to voice-mail system 11 in a "directory entry" message.

Upon receipt of this message and its resultant awakening, at step 220, routine 501 checks whether this message's contents are the first directory entry retrieved during this cycle, i.e., this invocation of routine 501, at step 222. Illustratively, routine 501 makes this determination by checking whether template 503 is empty. If the answer to the check at step 222 is affirmative, routine 501 stores the extension number contained in the received "directory entry" message in template 503, at step 224. If the answer to the check at step 222 is negative, routine 501 compares the extension number contained in the received "directory entry" message against the contents of template 503 to determine if they are the same, at step 226.

If the extension numbers compared at step 226 are not the same, or following step 224, routine 501 verifies the contents of the received "directory entry" message, at step 228. Routine 501 then checks whether a temporary directory 502 has been created in memory 122, at step 230. On the first pass through step 230, the answer will be negative, so routine 501 creates the data structure for temporary directory 502 in memory 122, at step 232.

Following step 232, or if the check at step 230 reveals that temporary directory 502 exists, routine 501 compares the contents of the name field of the subscriber record contained in the received "directory entry" message against name entries in temporary directory 502, at step 234. If it finds a match, indicating that duplicate names exist in the directory information of database 111, routine 501 stores the name on a delete list 504 in memory 122, at step 236. If no match is found, routine 501 stores the contents of the name and extension fields of the subscriber record contained in the received "directory entry" message in temporary directory 502, at step 238. Following step 236 or 238, routine 501 returns to step 212 to obtain another directory entry from switching system 10.

Returning to step 226, if it is there determined that the just-received extension matches the extension stored in template 503, it indicates that the full directory has been retrieved from switching system 10. Routine 501 responds by deleting from temporary directory 502 all entries whose subscriber names are stored on delete list 504, at step 240. This means that none of the directory records from database 111 that have duplicate name fields appear in temporary directory 502 and in database 131. Illustratively, voice-mail system 11 will handle these subscribers in the conventional "stand-alone" mode of operation. Routine 501 then causes database processor 130 to replace any existing directory in database 131 with the contents of temporary directory 502, at step 242. Routine 501 also simulates pressing of "normal" button 143 on a telephone 140 by generating a "normal button pressed" message, at step 244, and sending it to switching system 10, at step 246, to terminate the use of the "directory" feature. Routine 501 then exits, at step 248.

Figure 4:
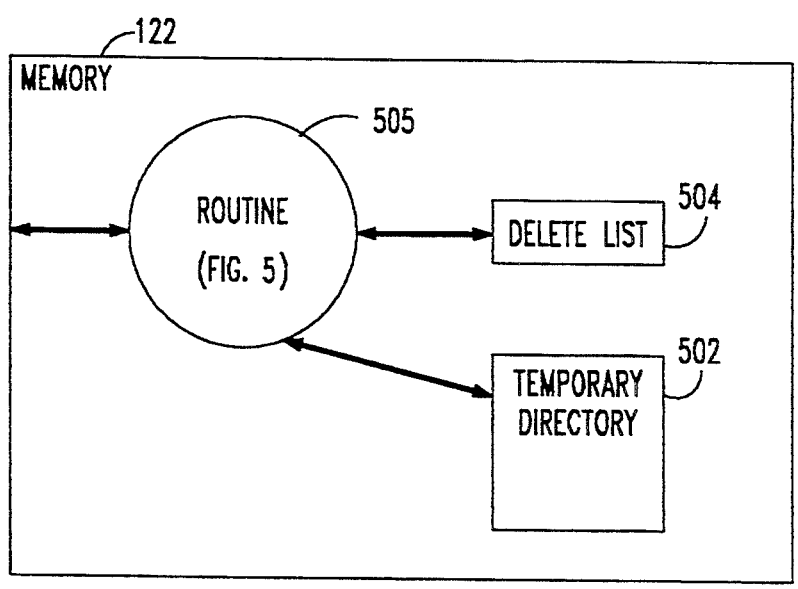
FIG. 4 is a block diagram of a second embodiment of the emulation function of the adjunct processor of FIG. 1.
Figure 5:
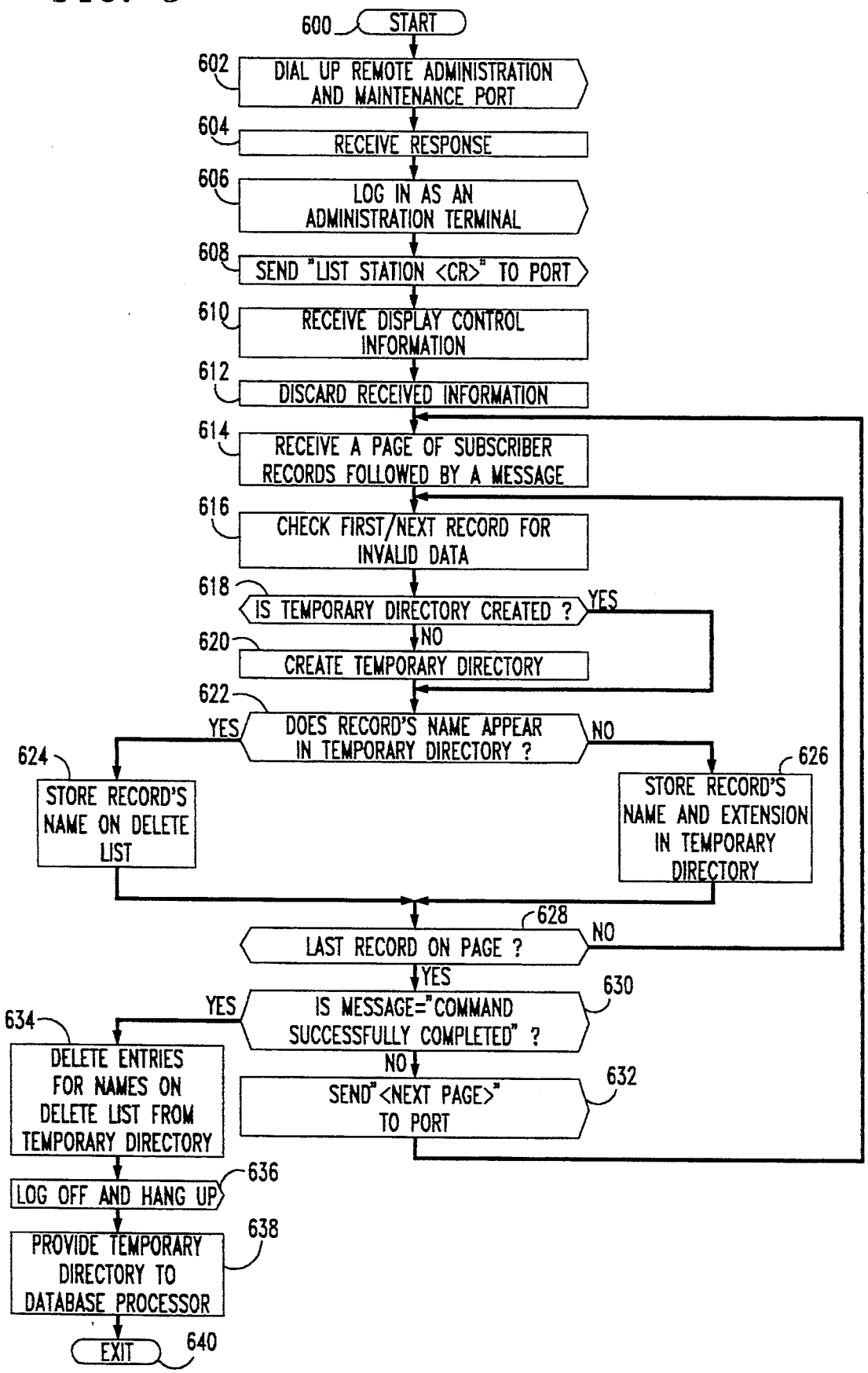
FIG. 5 is a flow diagram of the routine of the function of FIG. 4.

To obtain a copy of the directory information by using remote administration and maintenance port 119, voice-mail system 11 makes use of the emulation function shown in FIG. 4. It comprises data structures delete list 504 and temporary directory 502, which are the equivalents of the data structures of the same designation in FIG. 2, and a routine 505, stored in memory 122. Data structures 502 and 504 are used by routine 505, which is flowcharted in FIG. 5.

Control processor 121 executes routine 505 from memory 122. Upon its invocation, at step 600, routine 505 automatically dials up a connection to remote maintenance and administration port 119, at step 602. Upon receiving a response—an acknowledgment of establishment of the connection—from database processor 110 at step 604, routine 505 logs in on processor 110 as administration terminal 145 would, at step 606, and then sends the ASCII code for the characters that make up the words "list station" followed by a carriage return, to database processor 110, at step 608—as would administration terminal 145.

Database processor 110 responds to receipt of the "list station" command by sending display-control information followed by a page of subscriber records retrieved from database 111, to voice-mail system 11. If this is the last page of subscriber records that is available to be sent, database processor 110 follows it up with a display message stating "Command successfully completed". If more records are available to be sent, database processor 110 sends the display message stating "Press CANCEL to quit—press NEXT PAGE to continue" following sending of the page of records.

Routine 505 receives the display-control information, at step 610, and discards it, at step 612. Routine 505 then receives the page of subscriber records and accompanying message, at step 614. Routine 505 then examines the first of the records of the received page of records and verifies that its contents are valid, at step 616. Routine 505 then checks whether a temporary directory 502 has been created in memory 122, at step 618. On the first pass through step 618, the answer will be negative, so routine 505 creates the data structure for temporary directory 502 in memory 122, at step 620.

Following step 620, or if the check at step 618 reveals that temporary directory 502 exists, routine 505 compares the contents of the name field of the validated subscriber record against name entries in temporary directory 505, at step 622. If it finds a match, indicating that duplicate names exist in the subscriber information of database 111, routine 505 stores the name on a delete list 504 in memory 122, at step 624. If no match is found, routine 505 stores the contents of the name and extension fields of the validated subscriber record in temporary directory 502, at step 626.

Following step 624 or 626, routine 505 checks whether the just-processed record was the last record on the received page of records, at step 628. If not, routine 505 returns to step 616 to process the next record from the received page; if so, routine 505 checks whether the received message that accompanied the received page was "Command successfully completed", at step 630. If the message is instead "Press CANCEL to quit—press NEXT PAGE to continue", it means that there are more subscriber records in database 111 to be retrieved. Routine 505 therefore sends the ASCII code for the characters that make up the sequence "<NEXT PAGE>"—a simulation of pressing the "NEXT PAGE" feature button on administrative terminal 145—to database processor 110 via port 119, at step 632, to cause database processor 110 to retrieve another page of subscriber records from database 111 and send it to voice-mail system 11. Routine 505 then returns to step 614 to receive this page and to process the records contained therein.

Returning to step 630, if the message accompanying the received page is found there to be "Command successfully completed", it means that database processor 110 has completed sending all subscriber records contained in database 111 to voice-mail system 11. Routine 505 responds by deleting from temporary directory 502 all entries whose subscriber names are stored on delete list 504, at step 634. This means that none of the subscriber records from database 111 that have duplicate name fields appear in temporary directory 502 and in database 131. Illustratively, voice-mail system 11 will handle these subscribers in the conventional "stand-alone" mode of operation. Routine 505 then logs off of database processor 110 and hangs up the connection to port 119, at step 636, in a conventional manner. Routine 505 then causes database processor 130 to replace any existing directory in database 131 with the contents of temporary directory 502, at step 242. Routine 505 then exits, at step 640.

Of course, it should be understood that various changes and modifications to the illustrative embodiment described above will be apparent to those skilled in the art. For example, the adjunct processor can simulate interactions of other terminals and devices with the switching system to gain access to the desired information. Such changes and modifications can be made without departing from the spirit and the scope of the invention and without diminishing its attendant advantages. It is therefore intended that all such changes and modifications be covered by the following claims.

I claim:

1. A method of obtaining switching system database information at an adjunct processor, comprising the steps of:

interacting with a switching system from an adjunct processor by simulating interaction of a terminal with the switching system by means of which interactions the terminal requests and obtains access to contents of a database of the switching system, including signaling to the switching system a desire to access the database, in a same manner as the terminal signals to the switching system the desire to access the database, and signaling to the switching system a desire to have the switching system sequentially retrieve and provide to the adjunct processor each item of the database without directly identifying to the switching system any particular item of the database, in a same manner as the terminal signals to the switching system the desire to have the switching system sequentially retrieve and provide to the terminal each item of the database without directly identifying to the switching system any particular item of the database; and in response to the interacting, receiving the contents of the database from the switching system at the adjunct processor for use by the adjunct processor.

2. The method of claim 1 further comprising the step of:

in response to the receiving, populating a database of the adjunct processor with the received contents for future use of the contents by the adjunct processor.

3. The method of claim 1 wherein the step of interacting comprises the step of:

interacting with the switching system in a same manner as a telephone station set and invoking a directory feature of the switching system to obtain directory information from the database of the switching system.

4. The method of claim 1 wherein the step of interacting comprises the step of:

interacting with the switching system through a remote maintenance and administration port in a same manner as an administration terminal to obtain subscriber records from the database of the switching system.

5. The method of claim 1 wherein the step of receiving comprises the step of:

receiving from the switching system both extension numbers and corresponding subscriber names of subscribers served by the switching system.

6. An adjunct processor for use with a switching system comprising:

means for performing adjunct processing functions;

means for interacting with a switching system by simulating interactions of a terminal with the switching system by means of which interactions the terminal requests and obtains access to contents of a database of the switching system, including means for signaling to the switching system a desire to access the database, in a same manner as the terminal signals to the switching system the desire to access the database, and means for signaling to the switching system a desire to have the switching system sequentially retrieve and provide to the adjunct processor each item of the database without directly identifying to the switching system any particular item of the database, in a same manner as the terminal signals to the switching system the desire to have the switching system sequentially retrieve and provide to the terminal each item of the database without directly identifying to the switching system any particular item of the database; and means cooperative with the interacting means and the performing means for receiving the contents of the database from the switching system for use by the performing means.

7. The adjunct processor of claim 6 wherein the receiving means comprise:

a database for storing the received contents for future use of the received contents by the performing means.

8. The adjunct processor of claim 6 wherein the interacting means comprise:

means for interacting with the switching system in a same manner as a telephone station set and invoking a directory feature of the switching system to obtain directory information from the database of the switching system.

9. The adjunct processor of claim 6 wherein the interacting means comprise:

means for interacting with the switching system through a remote maintenance and administration port in a same manner as an administration terminal to obtain subscriber records from the database of the switching system.

10. The adjunct processor of claim 6 wherein the receiving means comprise:

means for receiving from the switching system both extension numbers and corresponding subscriber names of subscribers served by the switching system.

11. The method of claim 1 wherein the step of signaling a desire to access the database comprises the step of sending to the switching system a database-access request for said database, and the step of signaling a desire to have the switching system sequentially retrieve and provide each item of the database comprises the step of sending to the switching system a series of next-item requests.

12. The method of claim 3 wherein the step of signaling a desire to access the database comprises the step of sending to the switching system a directory-access request, and the step of signaling a desire to have the switching system sequentially retrieve and provide each item of the database comprises the step of sending to the switching system a series of next-item requests.

13. The method of claim 4 wherein the step of signaling a desire to access the database comprises the step of sending to the switching system a station-information database-access request, and the step of signaling a desire to have the switching system sequentially retrieve and provide each item of the database comprises the step of sending to the switching system a series of next-page requests.

14. The adjunct processor of claim 6 wherein the means for signaling a desire to access the database comprise means for sending to the switching system a database-access request for said database, and the means for signaling a desire to have the switching system sequentially retrieve and provide each item of the database comprise means for sending to the switching system a series of next-item requests.

15. The adjunct processor of claim 8 wherein the means for signaling a desire to access the database comprise means for sending to the switching system a directory-access request, and the means for signaling a desire to have the switching system sequentially retrieve and provide each item of the database comprise means for sending to the switching system a series of next-item requests.

16. The adjunct processor of claim 9 wherein the means for signaling a desire to access the database comprise means for sending to the switching system a station-information database-access request, and the means for signaling a desire to have the switching system sequentially retrieve and provide each item of the database comprise means for sending to the switching system a series of next-page requests.

* * * * *